May 9, 1961 J. R. WICOFF 2,983,118
ALIGNED ANTI-FRICTION SHAFT COUPLING
Filed June 17, 1958
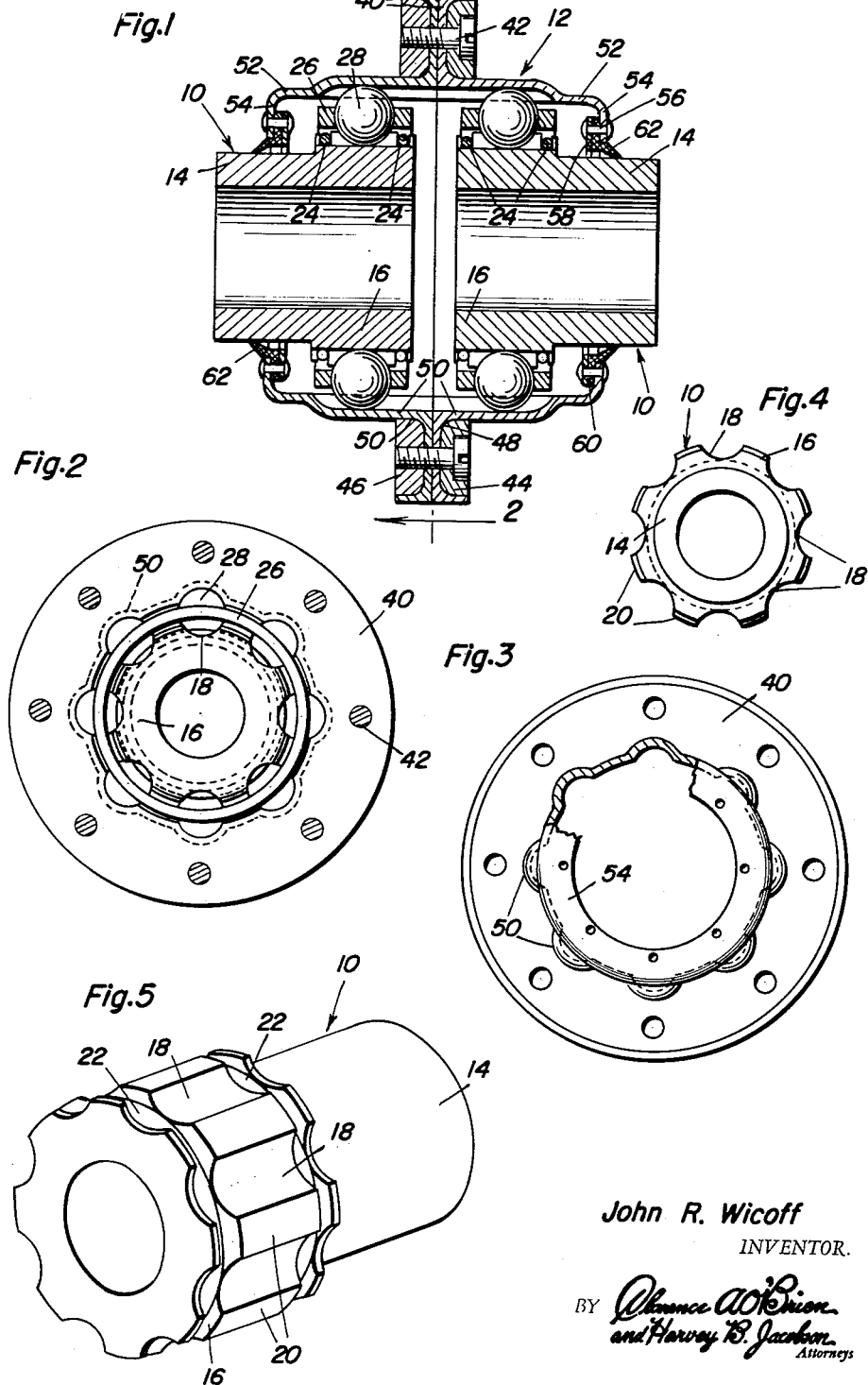
John R. Wicoff
INVENTOR.

United States Patent Office 2,983,118
Patented May 9, 1961

2,983,118
ALIGNED ANTI-FRICTION SHAFT COUPLING
John R. Wicoff, 4656 Harrison St., Gary, Ind.

Filed June 17, 1958, Ser. No. 742,599

5 Claims. (Cl. 64—9)

This invention comprises a novel and useful aligned anti-friction shaft coupling and more particularly relates to a flexible coupling for drivingly connecting the ends of shafts in a manner to allow for a slight misalignment of the adjacent ends of the shafts while utilizing ball and recess coupling elements to reduce friction arising from relative movement between the shaft ends and the coupling.

The principal object of this invention is to provide a flexible ball bearing type of coupling for connecting together the adjacent ends of a pair of shafts, even though the latter may be slightly misaligned, and for effectively transmitting torque between the shafts despite such misalignment.

A further object of the invention is to provide a flexible shaft coupling in accordance with the foregoing object which shall be capable of economical manufacture, shall be quite compact in construction, will admit of sealed in lubrication of the device, and shall be capable of quick assembly or disassembly.

An additional important object is to provide a flexible shaft coupling in compliance with the preceding objects and which may advantageously and economically be enclosed or housed in a pressed metal closure or shell of sheet metal.

A still further and very important object of the invention is to provide a flexible ball bearing coupling for shafts and which shall have provision retaining the ball bearings in a single plane thereby preventing any binding action of the ball bearings upon the action of the coupling.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in vertical central longitudinal section through the coupling device in accordance with this invention, the two shaft receiving elements of the device being shown in longitudinal alignment with each other;

Figure 2 is a vertical transverse sectional view taken substantially upon the plane indicated by the section line 2—2 of Figure 1;

Figure 3 is an end elevational view of one of the coupling members, parts being broken away;

Figure 4 is an end elevational view of one of the hubs forming a part of the coupling means; and Figure 5 is a perspective view of one of the shaft receiving hubs in accordance with the invention.

The driving and driven shafts, not shown, are adapted to be secured in any desired and suitable manner as by the use of keys, splines, pins or the like in the axially aligned bores of a pair of hubs, each of which is designated generally by the numeral 10. As shown in Figure 1, these hubs are secured in spaced axial alignment and are enclosed by a housing or casing designated generally by the numeral 12. This casing 12 constitutes a shell which encloses the adjacent ends and the major portion of the hubs, the ends of the shafts secured therein, and the coupling elements which lock the hubs to each other against relative rotation, while permitting a limited amount of endwise movement of the hubs and even a slight angular or offset misalignment of minor magnitude between the hubs and their shafts.

Referring first to the hub construction shown in Figures 1 and 5, it will be observed that each hub 10 comprises a sleeve 14 having a diametrically enlarged end portion 16 at the adjacent ends of the two hubs. Although the hub sleeves 14 and enlarged portions 16 are illustrated as of integral construction, they may in some instances be separately formed and rigidly assembled, as by keys, screw threads, welding or the like. A series of shallow semi-cylindrical channels, grooves, or recesses 18 are provided in the exterior diametrically enlarged surface of the portion 16, these grooves being preferably open at each end thereof.

The hubs 10 are preferably made of a hardenable steel and the flutes 20 between the recesses or grooves 18 alone are to be hardened. This construction is thereby specifically adapted for induction hardening. It is preferred that the whole hub shall not be hardened as this would preclude the possibility of re-boring or key seating the same. The hub may be milled or ground to provide the grooves or recesses 18 and the flutes 20 which comprise a portion of the coupling locking surfaces, after which the hub may be heat treated, quenched and ground to final size and finish.

At the opposite ends of the diametrically enlarged portion 16 of the hubs, there are provided annular or circumferentially extending grooves 22, which are adapted to receive conventional split retaining or locking rings 24 therein. A cage 26 for each hub 10 receives and retains a plurality of ball elements 28 which latter are disposed in the grooves 18. The balls are confined in the grooves 18 in the hub portions 16 and in complementary grooves in the housing 12, as will be more readily apparent hereinafter, to thereby prevent relative rotation between the hubs and the housing but to allow a limited flexing or bending therebetween. The cages 26 serve the important function of retaining the assembly of balls 28 together to prevent their falling out when the coupling is dismantled for assembly upon the shaft, and even more important, retains the series of balls in a common plane, substantially radial of the axis of the hub, whereby to prevent binding of the hubs in the housing when relative bending between the two hubs is necessary. The locking rings 24 serve to limit the axial movement of the set of balls confined therebetween.

Referring next to Figures 1, 2 and 3 it will be seen that the casing or shell 12 consists of two complementary generally cylindrical sections which are of identical construction, and are provided with mating flanges 40 which project radially outwardly beyond the aligned sections and which are detachably coupled together as by fastening bolts 42 extending through these flanges and which fastening bolts are seated in back up rings 44 and 46 which are retained in circumferentially extending channels 48 and 50 in the flanges.

Along the major portion of their length, the sections of the shell or casing 12 are provided with longitudinally extending channels, recesses or grooves 50 which are complementary to and coextensive in length with the previously mentioned grooves 18 on the hubs. The grooves 50 of the casing 12 and the previously mentioned grooves 18 of the hubs 10 confine the balls 28 therebetween so that relative rotation between hubs and casing is completely prevented although a limited axial movement of the hubs with respect to each other and their casing and a limited tilting of one hub with respect to the other is permissible.

At their outer extremities, the two sections of the casing 12 are diametrically reduced as at 52 and are provided with inturned flanges 54. By means of rivets 56 and retaining rings 58, the flanged peripheral portions 60 of resilient packing and sealing washers 62 are secured to the inside surfaces of the casing sections and project axially outwardly beyond the inturned flanges 54 to resiliently bear against the exterior surface of the hubs 10 upon the end portions 14 thereof.

Thus, the casing has a fluid tight seal with the hubs to thereby prevent the ingress of dust or foreign matter into the shaft coupling means and also to retain lubricant for the elements of the coupling. The form of seal shown is illustrative only and types of seals may be provided, as desired.

The shell or casing 12 is preferably fabricated by pressing the same from flat or sheet metal. The construction admirably lends itself to a convenient process of manufacture whereby the cup-shaped sections of the casing may be drawn in any press equipped with suitable dies and the flutes pressed therein either in a later operation or possibly in the same operation. It is contemplated that the thickness of the sheet metal shall be somewhat heavier than is usual or customary for sheet metals usually formed in similar shapes, in view of the necessary ability to transmit torque to the ball coupling elements. A certain amount of elasticity in the casing material is also desirable.

The coupling described hereinbefore possesses the distinct advantages of flexibility in permitting angular misalignment of the shafts, and replaces the sliding friction with the rolling friction of the balls, thereby greatly increasing the life of the coupling. Further, it enables a very effective lubrication to be retained in the casing upon the moving or working elements of the coupling, thereby greatly contributing to the life and reducing the necessity for servicing the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An anti-friction shaft coupling comprising a pair of aligned hubs adapted to receive the ends of driving and driven shafts, said hubs having circumferentially spaced axially extending grooves in their exterior surfaces, a sheet metal casing surrounding and enclosing the adjacent ends of said hubs and having in its interior surface circumferentially spaced and axially extending grooves complementary to those of said hubs, a set of balls received in the grooves of each hub is engaged in the grooves of said casing for locking the hubs and casing against relative rotation while providing for limited axial movement and angular movement therebetween, said casing including a pair of complementary sections having mating radially enlarged flanges at the adjacent ends, said flanges having circumferential channels on their opposite surfaces, rings seated in said circumferential channels with fasteners engaging both of said rings.

2. The combination of claim 1 including a cage for each set of balls, locking grooves in said hubs and retaining rings therein confining said balls and cages to limited axial movement and said hubs.

3. The combination of claim 1 wherein said casing has inturned flanges at its opposite ends, sealing elements secured to said flanges and resiliently embracing said hubs and establishing a fluid tight seal therewith.

4. The combination of claim 1 wherein said hubs have their adjacent ends diametrically enlarged and said grooves being disposed in the exterior surface of said diametrically enlarged ends.

5. The combination of claim 1 wherein said hubs have their adjacent ends diametrically enlarged and said grooves being disposed in the exterior surface of said diametrically enlarged ends, the flutes between said grooves being hardened.

References Cited in the file of this patent

UNITED STATES PATENTS

| | | |
|---|---|---|
| 1,225,478 | Murray | May 8, 1917 |
| 1,675,065 | Thomas | June 26, 1928 |
| 1,861,364 | Schreck | May 31, 1932 |
| 2,099,848 | Grodhaus | Nov. 23, 1937 |
| 2,441,052 | Wilmer | May 4, 1948 |
| 2,453,964 | Betz | Nov. 16, 1948 |
| 2,783,626 | Klomp | Mar. 5, 1957 |

FOREIGN PATENTS

| | | |
|---|---|---|
| 377,761 | Great Britain | Aug. 4, 1932 |